United States Patent [19]
Henry et al.

[11] Patent Number: 4,567,372
[45] Date of Patent: Jan. 28, 1986

[54] METHOD FOR CONTINUOUSLY MEASURING THE PERIMETER OF WRAPPED OBJECTS OF GENERALLY UNIFORM CROSS-SECTION

[75] Inventors: James W. Henry, Kingsport; Robert C. Mumpower, Grey, both of Tenn.

[73] Assignee: Eastman Kodak Company, Rochester, N.Y.

[21] Appl. No.: 559,563

[22] Filed: Dec. 8, 1983

Related U.S. Application Data

[63] Continuation-in-part of Ser. No. 409,754, Aug. 19, 1982, now Defensive Publication No.

[51] Int. Cl.⁴ .......................... B31B 1/00; A24C 1/00
[52] U.S. Cl. ...................................... 250/560; 493/4; 493/37; 493/40; 131/284
[58] Field of Search ...................... 131/339, 284, 906; 493/4, 11, 18, 40, 37; 250/560, 223 R; 101/DIG. 25

[56] References Cited

U.S. PATENT DOCUMENTS 3,812,349  5/1974  Gugliotta et al. .......... 250/223 R
4,170,003 10/1979  Danielsson et al. ............ 250/560
4,291,712  9/1981  Koster et al. ................ 131/339
4,486,186 12/1984  Grumer ....................... 493/4

Primary Examiner—David C. Nelms
Assistant Examiner—J. Jon Brophy
Attorney, Agent, or Firm—Malcolm G. Dunn; Daniel B. Reece, III

[57] ABSTRACT

Disclosed is a method of continuously determining the perimeter of an elongated object of generally uniform cross-section which comprises wrapping the object with a sheet of flexible material having a single band imprinted thereon in such manner that the single band extends axially parallel to the object and becomes partially obscured by an overlapping edge of the sheet, placing detection means in position to detect the width of the unobscured portion of the single band, the detection means being capable of determining the width of the unobscured portion of the single band, moving the object and the detection means relative to each other in a manner such that continuous detection of the single band and the measurement of the width of the unobscured portion of the single band occurs and correlating the measured width of the unobscured portion of the band to the perimeter of the object.

7 Claims, 9 Drawing Figures

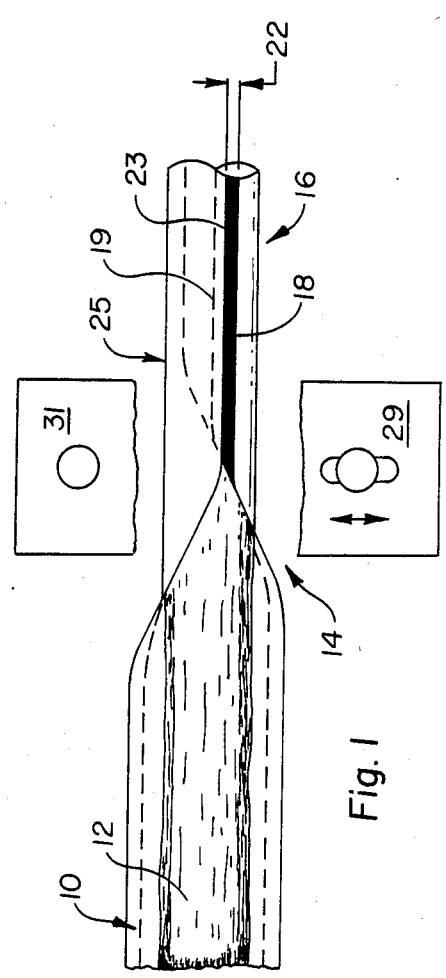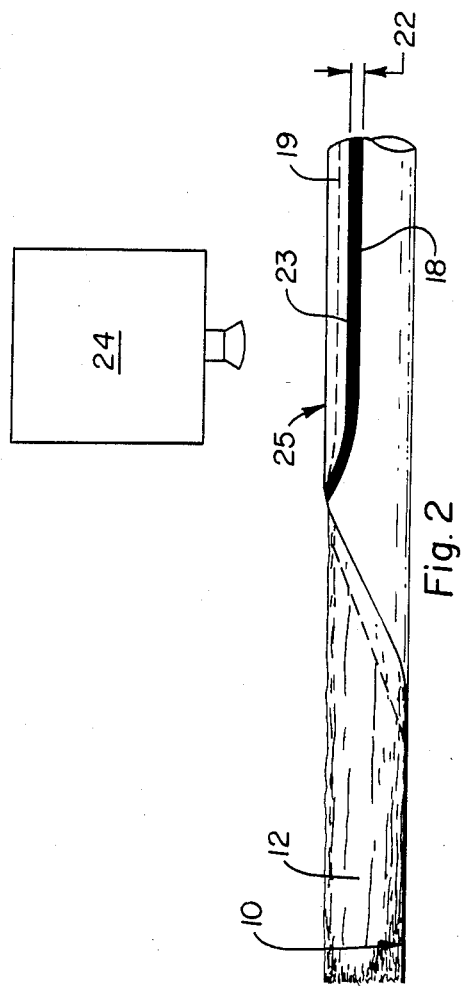

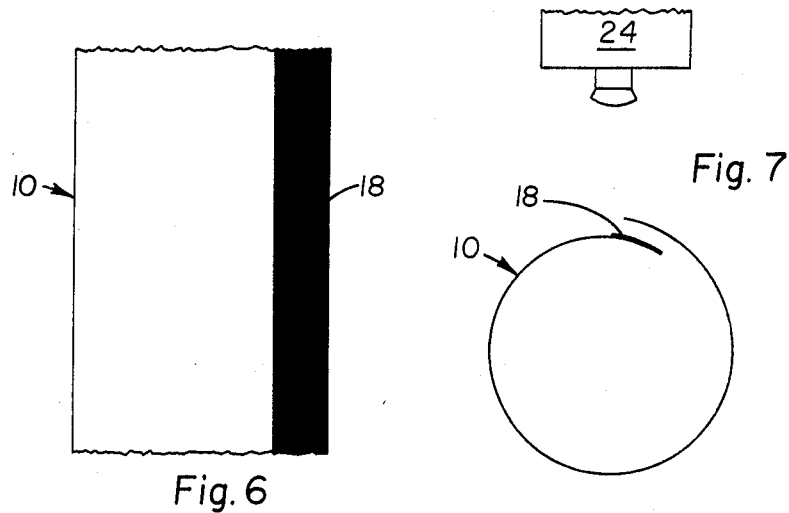
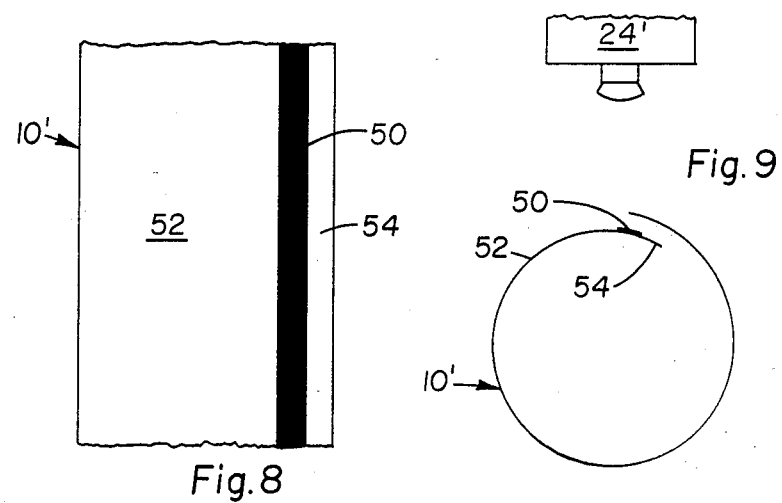

METHOD FOR CONTINUOUSLY MEASURING THE PERIMETER OF WRAPPED OBJECTS OF GENERALLY UNIFORM CROSS-SECTION

This is a continuation-in-part of our U.S. patent application No. 409,754 filed Aug. 19, 1982.

TECHNICAL FIELD

This invention relates to a method for continuously monitoring the peripheral measurement of wrapped objects. It has particular utility in instances where an object is wrapped with sheet material, such as in the case of cigarette filters, where a bundle of fibers is wrapped with paper.

BACKGROUND ART

Earlier methods of determining the diameter or circumference of a cigarette filter plug have utilized an air gauge device which requires that the plug be encircled by a pressurized annulus which is arranged to measure the amount of air escaping from the annular gap between the outer circumference of the filter plug and the inner diameter of the annulus. Such a device is operable as long as the circumference wrap of the filter plug is airtight. Such an arrangement permits pressure to build up due to the narrowness of the annular gap between the encircling annulus and the filter rod. If air is permitted to escape via means other than the gap, the measuring system is not accurate. This is the case when the paper forming the outer surface of the filter rod is porous. With the advent and need for a porous outer wrap for the filter plug rather than the relatively airtight wrap used in earlier versions of the filter plug, improved means of measuring the diameter of the filter plug are required. These means must be unaffected by porosity of the filter plug wrapping paper.

In the manufacture of cigarette filter plugs, it becomes necessary to assure that the diameter or circumference of the wrapped plug conforms to the dimensions of the subsequent cigarette resulting from the assembly of the filter plug with the cigarette.

In our copending U.S. patent application Ser. No. 409,754, filed Aug. 19, 1982, we disclosed a process of measuring the circumference of the filter plug in which two or more lines running in a direction parallel to the long dimension of the paper are imprinted on the filter wrap paper. Since the paper is wrapped around the filter plug core fibers so that the long aspect of the filter plug runs parallel with the filter plug axis, these lines then run longitudinally along the filter rod. By positioning the lines so that they fall near the overlap where the seam is made in the filter rod wrapper as it surrounds the core fiber bundle, means are offered to reference a dimensional measuring system. By determining the separation of the lines positioned on either side of the overlapped seam it is possible to determine the circumference of the filter rod, since the lines are placed a known distance apart and the circumference is composed of this known distance plus the measured distance between the lines as they appear separated by the overlapped seam. Through the use of video measuring apparatus such as a standard television camera or a linear array solid-state video measuring device, the spacing between the two lines separated by the seam can be accurately determined. If four lines are imprinted, the measurement between the outer lines and the inner lines can be used to determine the extent of stretching of the paper thereby offering a means of accurately compensating for the stretch of the paper in the measurement of the filter rod circumference. Should electronic means not be acceptable, an optical measuring device consisting of either a magnifying lens with incorporated reticle or a projection screen device incorporating a scale for measurement may be used.

We have since discovered that a greater simplification may be achieved in the printing of the dimensional establishing elements on the filter wrap material. This simplification is such that only one band of contrasting color or black may be printed on the wrapping material. The result of this discovery is that the production process is simplified for making the gravure roll required to print the wrapper by the gravure process, or making plates or letterpress type to print the wrapper by either the lithographic or letterpress process may be simplified. The nature of our discovery is such that it was unanticipated in our previous disclosure. In our copending process, which was devised around the concept of printing two lines of identical width but spaced to be equidistant from the edges of the filter wrapping material, the process required that the two color stripes or bands be precisely positioned and spaced on the wrapper material. Control of both the width of each band and the spacing between bands must be precise, and this is made difficult by the tendency of the inks used in the gravure process to spread, and the tendency of letterpress and lithographic inks to form an indistinct edge. In the process of the present invention, we provide an improvement in precision because of the eliminations of three printed edges and the necessity for spacing two bands a specified distance apart.

DESCRIPTION OF THE INVENTION

According to the present invention, therefore, we provide a method of continuously determining the perimeter of an elongated object of generally uniform cross-section. The process comprises a. forming on a flexible elongated sheet a single band of predetermined width and of contrasting color with respect to the sheet, the band being parallel to two opposite elongated and parallel edges of the sheet, and wrapping the elongated object with the sheet so that one of the opposite elongated edges is overwrapped with respect to the other of the elongated edges and overlies and obscures a portion of the width of the single band, the single band being generally axially parallel to the elongated object;

b. placing detection apparatus in position to detect the single band on the elongated object, the detection apparatus having an arrangement for determining the width of the unobscured portion of the single band;

c. moving the elongated object and the detection apparatus relative to each other in a manner such the continuous detection of the width of the unobscured portion of the single band occurs; and d. correlating the measured width to the perimeter of the elongated object.

The single band may be printed with an optically detectable ink.

The detection apparatus in the method may be a line array video camera which is capable of receiving reflected light on an arrangement of photoelectric sensor elements connected in a manner such that the position of displacement of the reflected light form a predetermined position on the arrangement is sensed electronically by counting the number of photoelectric sensor elements between the aforementioned predetermined and displacement positions.

The method may also comprise the step of adjusting the perimeter of the object in response to detection of a change in the width of the unobscured portion of the single band.

The method further may include the steps of generating an electrical signal which is proportional to the number of sensor elements counted, using the aforementioned electrical signal to measure the width of the unobscured portion of the single band, and correlating the measured width to the perimeter of the object.

The elongated object of the method may be a cigarette filter rod.

This project has specific utility in the manufacture of cigarette filter rods in which a fibrous core of material is wrapped in a porous paper wrapper. It has utility also in the diameter control of those tubular elements which in combination form the structure of a cigarette. Although it will be apparent to those skilled in the art that the method disclosed herein is useful in many other fields where perimeter measurements must be continuously monitored, for the sake of simplicity the method will be described herein with respect to cigarette filter rods.

The process and apparatus described can be used in any manufacturing process where webs of elongated flat material are converted into tubing by rolling the flat material around the longitudinal axis of the web. In the manufacture of cigarette filter plugs, web material is rolled into a tube to form the wrapper for fibrous filter material which serves as the core of the filter. In the manufacture of tubing from paper, plastic, fabric, glass, etc., where a flat web is rolled from a tubing by lapping over the edges of the web material and sealing the edges together, the placement of a single band of contrasting color along the back side of the web material will permit automatic control of the circumference and thus the diameter of the tubing.

The means by which such a circumferential determination can be made from the filter plug is based on the placement of a single band of predetermined width and contrasting color on the wrapper paper. The single band runs along the wrapper paper parallel to the edges of the paper as it is withdrawn from the paper roll. The paper is folded into an elongated cylinder which encloses the fiber filter plug core. Thus the single band imprinted on the paper will be parallel to the long dimension of the paper and will also be parallel to the axis of the filter plug. By arranging the single band so that it is either near to or borders one of the longitudinal edges of the filter rod wrapper, it is possible to determine the circumference of the filter rod simply by measuring the unobscured width of the single band after it has been rolled around the filter material so that one of the longitudinal edges of the wrapping paper overlaps the opposite longitudinal edge and a portion of the single band imprinted on such wrapping paper.

BRIEF DESCRIPTION OF THE DRAWINGS

FIG. 1 is a partial plan view of cigarette filter material being wrapped with sheet material having a single band imprinted thereon in accordance with this invention;

FIG. 2 is an elevational view of the cigarette filter material shown in FIG. 1, also illustrating means for measuring the unobscured width of the single band;

FIG. 6 is a plan view of a section of wrapper paper illustrating the placement of a single band along the border of one of the longitudinal edges of the wrapper paper;

FIG. 7 is a schematic view showing the wrapper paper rolled into a cylinder with one longitudinal edge partially obscuring the single band shown in FIG. 6;

FIG. 8 is an alternate embodiment of a section of wrapper paper illustrating the placement of the single band near to one of the longitudinal edges of the wrapper paper; and FIG. 9 is a schematic view showing the wrapper paper rolled into a cylinder with one longitudinal edge partially obscuring the single band shown in FIG. 8.

BEST MODE FOR CARRYING OUT THE INVENTION

Figure 4:
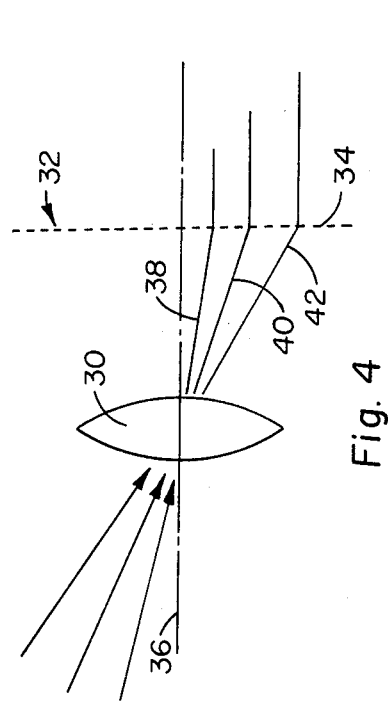
FIG. 4 is a diagrammatic view illustrating the reception of a reflected beam onto an arrangement of photoelectric sensor elements.

As will be noted from FIG. 1, the paper 10 is flat and elongated prior to being wrapped around the fibrous core material of the filter plug 12. At point 14, the paper is caused to roll and gradually close until at point 16 using conventional equipment well known to those skilled in the art, it has become a cylinder with a seam formed by overlapping the paper where it is joined by an adhesive strip.

Single band 18 is parallel with and approximately aligned with the edges of the paper. The single band 18 is imprinted on the paper and becomes partially obscured by the overlapping paper, as may be seen from other edge 19 of the single band shown in dotted lines. The unobscured portion or width of the single band is shown at 22, which is bordered by the edge of the overlapping portion of the paper.

Electronic means 24 are provided for measuring the unobscured width of the single band 18. The electronic means or line array video camera 24, such as manufactured by the Reticon Corporation of Sunnyvale, Calif., is positioned above the continuous filter rod prior to the filter rod being segmented into individual filter elements or plugs. The electronic output of the array video camera can be appropriately processed and used to readjust the controls which affect the circumference of the filter rod 25. Thus, the filter rod diameter control can be fully automatic.

Should automatic control of filter rod diameter not be required, an alternate process employs a projection lens and screen (not shown). The image of the single band greatly magnified is projected on a screen. This is compared to a built-in scale imposed on the screen and the operator judges the degree of adjustment needed to bring the single band within control limits. When the single band is appropriately adjusted to the proper width, the process is in control.

Figure 3:
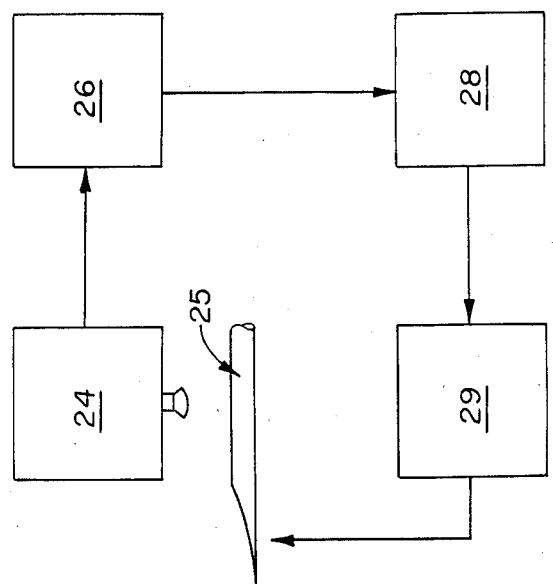
FIG. 3 is a diagrammatic view of an automated system for controlling circumference of the wrapped material.

In a fully automated system incorporating the video camera 24 using either a linear array of photocells or a full video tube camera, the arrangement is as shown in FIG. 3. Here the filter rod 25 is imaged on the sensitive medium of the video camera 24. The video signal is sent to signal processor 26 where it is compared with the desired band width information. An error signal may be sent from this processing unit to the electrical signal-to-mechanical signal translator 28 where it may be translated into either a pneumatic, hydraulic, or electrical signal which is supplied to the control element 29, which is an adjustable trumpet folder for adjusting the filter rod circumference. FIG. 1 illustrates in diagrammatic form how to adjust the perimeter of the rod by moving adjustable trumpet folder 29 with respect to stationary trumpet folder 31. The curvature details are not shown for the trumpet folders, but they are well known to those skilled in the art.

Figure 5:
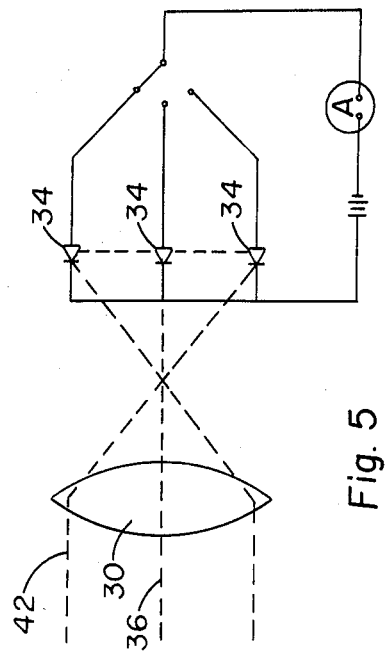
FIG. 5 is a view similar to FIG. 3, illustrating a greatly reduced number of photoelectric sensor elements, and the principle of operation of a line array video camera.

Use of the line array video camera 24 such as illustrated in FIGS. 3–5 (well known in the art and commercially available) as a means of measuring the unobscured width 22 of the single band 18 on the wrapper paper 10 is based on the construction of the linear photosensor array in the camera. The principal of operation of such a camera is illustrated in FIGS. 4 and 5. The camera focuses the reflected rays of light 36, 38, 40, and 42, by means of lens 30, onto a plate 32 having a plurality of photoelectric sensor bars 34, which are activated to generate an electrical signal proportional to the distance between the first bar illuminated, or the last bar left dark, and the beginning of the photoelectric sensor array. The camera and image source are aligned so that the furthermost level to be determined as to distance by the system produces light source which falls upon the first photoelectric sensor in the array. The distance between this first sensor and the other sensors in the array is then determined by counting the number of pulses which must be applied to the array in order to effect stepping from one photosensor to another, thus effectively switching from sensor to sensor. Those sensors which are not illuminated due to the darkness of the unobscured portion or width 22 of the single band projected on them may be detected and the number of steps necessary to provide the switching required recorded as a measure of the distance between the first darkened sensor and the second illuminated sensor in the array.

In a typical camera, 512 photodiode elements are arrayed with a spacing such that about 0.001 inch exists between each element. These elements are about 0.001 inch wide and about 0.10 inch long. A photographic lens focuses the image of the unobscured portion of the single band on the linear array. The normal lighter color of the wrapper paper results in the bulk of the elements receiving sufficient light so that they are fully activated. Where the unobscured portion of the single band is present, the elements do not receive much light and these elements are not fully activated. The elements compose links in a series electrical circuit where the degree of activation of the element results in a greater or lesser flow of electrical current through the series circuit. A single resistor is incorporated into the series circuit and each of the photoelectric elements is sequentially switched into the circuit due to the form of the array. As each element is switched into the circuit, the resistor develops a voltage commensurate with the amount of current permitted to flow through it by the photoelement. A large voltage is present for the fully lighted photoelements. A markedly lower voltage is present when those elements shadowed by the unobscured portion of the single band are in the circuit.

The photoelements are switched into the circuit and out of the circuit by a repeating pulse. By counting the number of pulses which occur between the voltage decline which takes place on sensing the beginning of the unobscured portion of the single band and that which takes place on sensing the second end of the unobscured portion of the of the single band, it is possible to obtain a precise measurement of the width of the unobscured portion of the single band. The precise placement of the photoelements in the array makes this possible. Essentially, the photoarray measures by counting elements not activated or activated by the dark or light image which is to be measured.

As an example of the invention, a cigarette filter plug machine is fitted with an imprinting device consisting of a lithographic offset roll and blanket, a permanent plate bearing an image of a single band. A black ink is used to imprint the paper. The tack of the ink is reduced to the point that the porous paper on which it is imprinted exhibits no tendency to pick.

Once through the imprinting stage, the paper is carried to the point where it encircles the fibrous filter core 12 and the seam is formed with a 2-millimeter overlap of the paper in the seam. After formation of the continuous filter rod 25, the rod is passed under the lens system of a Reticon linear array camera connected to a Reticon signal processing control unit. The controls of the Reticon control unit are adjusted to respond to a first black and second light condition and to count the number of photoelements arrayed between the first black and second light condition. There are 512 lines or photoelements in the Reticon linear array. The camera is spaced from the filter rod sufficiently to permit a calibration of the number of elements existing between the projected images of the unobscured portion of the single band imprinted on the filter rod. This calibration permits 450 lines to exist between the first black and second light images. The setpoint of the control unit is adjusted so that departure of 20 lines plus or minus from this adjustment results in triggering of the warning signal attached to the control system indicating that the first black and second light edges are too close together or too far apart. The number of photoelements chosen corresponds to a normal correct displacement of 5 millimeters between the edges of the unobscured portion of the single band imprinted on the filter rod.

When the filter plug machine is operated and the circumference of the filter rod being made is less than the desired 27 millimeters, the distance between the unobscured portion of the single band edges is smaller by the number of millimeters deficient in the circumference. Similarly an increase in circumference is accompanied by an increase in spacing measured between the unobscured portion of the single band edges. Using the electronic readout system permitted adjustment of the unobscured portion of the single band until it matches the width of assigned number of photoelements. Automatic feedback of the electronic signal to control this setting may be accomplished by those skilled in the art.

In another instance, a cigarette filter plug manufacturing machine is equipped with the printer and linear array described above. The experiment is run exactly as before with the exception that the digital count produced is introduced into a digital comparitor system composed of eight Type 7485 digital comparitor chips. The outputs of these chips are arranged to provide a positive output consisting of a logical one signal when the counter contents exceed the preset indication compared to the counter contents. This preset indication is provided by an array of eight digital switches producing a binary coded decimal output representative of each of the decimal inputs dialed into the switches. The digital comparitor also provides a separate logic one output for a determination that the counter contents are less than those of the switch array. Each of the logic one signals is fed through a separate terminal and consist of a voltage which falls to about 1.4 volts for a signal indicating no output and 5 volts for a signal indicating output. These signals are supplied to solid-stage zero crossover relays which are activated by light-emitting diodes optically connected to amplified phototransistors. The logic one signals are used to operate the light-emitting diodes of the relays. Thus, the presence of a logic one signal results in activating a light-emitting diode with the ultimate result that the solid-state relay is closed, permitting current to flow to an impulse motor producing one increment of movement for each impulse received. The impulse motor is arranged to increase the diameter of the filter rod when the logic one signal indicates that the rod diameter is less than the set point diameter. It also reduces the diameter if the logic one signal indicates that the rod is larger than the setpoint. Because of the frequent updating of information by the linear array video system measuring the width of the unobscured portion of the single band imprinted on the wrapper paper, an essentially continuous control of the rod diameter is achieved.

Porosity of the paper can, in some instances, result in diffusion of the inked single band on the paper. This degradation of the edges of the single band can be greatly reduced by resort to low-tack lithographic inks and the lithographic printing process rather than a fluid ink printed from metal dies such as would be done using the letterpress or gravure process. In these latter processes, the ink is quite fluid in character and more prone to spread in a porous uncoated paper such as is desirable for more advanced filter rod construction.

It will be obvious to those skilled in the art that a single band other than that printed in ink may be used in the practice of this invention. For example, a magnetic single band, metal reflective, fluorescent, and electrically conductive single band may be applied to the paper.

It is possible to preprint the wrapper paper. The likelihood of large error due to stretching or humidity effects on the paper is greatly reduced by resorting to printing immediately before the paper enters the plug-making machine.

The measurement system will function well using a linear array video camera, an area array video camera, and an electron beam scanned Vidicon television tube camera. Video cameras of other design are also operable provided the scanning of the image area is precise. Flying spot image transducers can be used to pick up the image of the unobscured portion of the single band printed on the paper.

In addition to the television techniques mentioned, tracking photoelectric cell arrangements to measure the width of the single band may also be utilized.

Optical means, such as projection microscopes, measuring microscopes, and traveling microscopes, can be used to determine the width of the unobscured portion of the single band. The methods mentioned utilizing the optical techniques are useful for measurement of the band width. They offer less utility as a means of pickup of a signal suitable to provide automatic control of the filter rod diameter.

In summary and with reference to FIGS. 6 and 7, therefore, the wrapping paper 10 is imprinted with a single band that has a contrasting color with respect to the wrapping paper. When the paper is rolled into a cylinder in which the axis of the cylinder is parallel to the longitudinal dimension of the single band, the resulting structure thus has an overwrap which covers or obscures a portion of the single band 18. Since the circumference of the cylinder is such that insufficient overwrap is available to completely cover the imprinted single band 18, a part of the imprinted portion remains exposed or unobscured. Measurement of this exposed or unobscured portion by a linear array video camera 24 (FIG. 7) or comparable camera will produce a measurement which is related to the circumference of the cylinder.

In an alternate embodiment of the invention, a narrow band 50 is precisely positioned with respect to the edges of the wrapping paper 10', leaving a wide unprinted area 52 and a smaller unprinted area 54 between the imprinted band and the edge of the wrapping paper. When rolled into a cylinder, the imprinted narrow band 50 is in ideal circumstances partially obscured by the overwrapped paper which completely covers the imprinted area 54 and paper edge and partially covers the imprinted narrow band 50. The unobscured portion of the narrow band 50 is measured by a linear array video camera 24' or comparable camera. The indication of width given by the camera is interpreted as tube or cylinder circumference.

The following examples serve to further illustrate the invention but it will be understood that they are included merely for purposes of illustration and are not intended to limit the scope of the invention.

EXAMPLE 1

In a filter plug manufacturing machine wrapping paper formed of a porous paper specially manufactured to permit air flow through the paper around a core of crimped continuous cellulose acetate fibers, a single line scan television camera manufactured by the Reticon Company of California, U.S.A., was arranged to scan a single color strip or band of black ink imprinted on the paper wrap by the gravure process. The black strip or band was imprinted to bleed over the edge of the wrapper on one edge and to form a sharply defined edge of black against the white of the paper on the other edge of the band. As the wrapper passed through the machine it was rolled to form a cylinder enclosing the fiber core material. At the point on the cylinder where the wrapper overwrapped to form a seam, the black strip or band was masked by the white edge of the paper so that the remaining strip or unobscured portion of the strip or band provided a black strip whose width was determined by the amount of overwrap of the paper. This arrangement provided a means whereby the camera scanning the black strip or unobscured portion of the band could obtain a measurement related to the circumference of the filter rod. The amount of black strip left showing or unobscured is a measure which can be interpreted in terms of the circumference of the filter rod.

EXAMPLE 2

As in Example 1, with the exception that the strip or band of black was imprinted by the offset lithographic process.

EXAMPLE 3

As in Example 1, with the exception that the strip or band of black was imprinted by the letterpress printing process.

EXAMPLE 4

As in Example 1, with the exception that the strip or band of imprinting was done in red ink, and the Reticon camera was fitted with a green filter to provide a suitable color contrast.

EXAMPLE 5

As in Example 1, with the exception that the unobscured portion of the strip or band was scanned by a projection optical system which projected the image of the strip or band on an engraved screen for comparison with the engraved reticle on the screen.

EXAMPLE 6

As in Example 1, with the exception that the imprinted band was narrow (one millimeter in width), did not bleed over the edge of the strip of paper, and was precisely positioned with respect to the edges of the wrapping paper. This offered reference points from which the circumference of the cylinder could be determined.

The process described is subject to error due to paper stretch. Errors due to location of multiple lines or errors due to error in line width printing, as disclosed in our copending application, are reduced since only a single band of color is imprinted. The system does require some calibration since the positioning of the imprinted edge of the color band must be precise with respect to one or both edges of the paper wrap. Further, the width of the paper wrap must be precisely controlled in the slitting process.

An imprinted band having a breadth sufficient to extend to the sharply defined edge between the imprinted and unimprinted area offers the greatest flexibility in application of the measuring and manufacturing process. Such a band permits wide variation in the circumference of the tube while assuring that no ambiguities will ensue due to the formation of tube circumferences which will result in total obscuration of the imprinted band, since it is only necessary to assure that the band is imprinted with sufficient breadth to serve in all circumstances. In a second instance it has been found that a narrow band correctly positioned to serve for a carefully determined range of circumferences offer aesthetic advantages and a further advantage of visual detection of excessively small circumference. When such a band is imprinted it is essential that it be so positioned that for all circumferences envisioned, the overwrap portion will never totally obscure the imprinted band. If total obscuration occurs, it is an indication that the circumference of the tube is too small.

Some additional advantage is inherent in the narrow band in that it is possible to arrange it so that only a very thin width of band is exposed by the shortfall of the overwrap. When this is the case, it is possible to arrange the line scan television camera to view this narrow band and interpret it in terms of the high ratios which take place when variation in the band width is present. When the ratio of change to total exposed width is calculated, very narrow widths result in the changes in width appearing large when calculated in terms of the change versus the total exposed width. Such an arrangement has been found to offer great sensitivity in determining the change in circumference.

With respect to aesthetic advantages of the narrow imprinted band, the narrowness of the line renders it less obtrusive and thus less objectionable to those who view any imprinting of the tubular configuration as a marring element.

The invention has been described in detail with particular reference to preferred embodiments thereof, but it will be understood that variations and modifications can be effected within the spirit and scope of the invention.

We claim:

1. Method of continuously determining the perimeter of an elongated object of generally uniform cross-section which comprises
   forming on a flexible elongated sheet a single band of predetermined width and of contrasting color with respect to said sheet, said band being parallel to two opposite elongated and parallel edges of said sheet, and wrapping said elongated object with said sheet so that one of said opposite elongated edges is overwrapped with respect to the other of said elongated edges and overlies and obscures a portion of the width of said single band, said single band being generally axially parallel to said elongated object;
   placing detection means in position to detect the unobscured portion of said single band on said elongated object, said detection means having means for determining the width of the unobscured portion of the single band;
   moving said object and said detection means relative to each other in a manner such that continuous detection of the width of said unobscured portion of said single band occurs, and
   correlating the measured width to the perimeter of said elongated object.

2. Method according to claim 1 wherein said single band is printed with an optically detectable ink.

3. Method according to claim 1 wherein said detection means is a line array video camera having means for receiving reflected light on an arrangement of photoelectric sensor elements connected in a manner such that the position of displacement of the reflected light from a predetermined position on said arrangement is sensed electronically by counting the number of said photoelectric sensor elements between said predetermined and displacement positions.

4. Method according to claim 1 comprising the step of adjusting the perimeter of said object in response to detection of a change in the width of the unobscured portion of said single band.

5. Method according to claim 3 and including the steps of generating an electrical signal which is proportional to the number of sensor elements counted, using said electrical signal to measure the width of the unobscured portion of said single band, and correlating the measured width of the perimeter of said object.

6. Method according to claim 1 wherein said object is a cigarette filter rod.

7. Method according to claim 5 wherein said object is a cigarette filter rod.

* * * * *